US010523118B2

(12) United States Patent
Dalena et al.

(10) Patent No.: US 10,523,118 B2
(45) Date of Patent: Dec. 31, 2019

(54) REVERSE RECOVERY CHARGE ELIMINATION IN DC/DC POWER CONVERTERS

(71) Applicant: Dialog Semiconductor (UK) Limited, London (GB)

(72) Inventors: Francesco Dalena, Leghorn (IT); Alexandre Morello, Leghorn (IT)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/915,205

(22) Filed: Mar. 8, 2018

(65) Prior Publication Data
US 2018/0294723 A1    Oct. 11, 2018

(30) Foreign Application Priority Data

Apr. 7, 2017    (DE) .................. 10 2017 205 956

(51) Int. Cl.
*H02M 3/156*    (2006.01)
*H02M 3/158*    (2006.01)
*H02M 1/00*    (2006.01)

(52) U.S. Cl.
CPC ......... *H02M 3/1563* (2013.01); *H02M 3/158* (2013.01); *H02M 3/1588* (2013.01);
(Continued)

(58) Field of Classification Search
None
See application file for complete search history.

(56) References Cited

U.S. PATENT DOCUMENTS 6,208,529 B1 * 3/2001 Davidson .......... H02M 3/33569
                                                363/132
6,396,250 B1    5/2002 Bridge
(Continued)

FOREIGN PATENT DOCUMENTS

DE    102 43 885    4/2004

OTHER PUBLICATIONS

German Office Action, File No.10 2017 205 956.7, Applicant: Dialog Semiconductor (UK) Limited, dated Nov. 13, 2017, 6 pgs., and English language translation, 5 pgs.
(Continued)

*Primary Examiner* — Adolf D Berhane
*Assistant Examiner* — Henry E Lee, III
(74) *Attorney, Agent, or Firm* — Saile Ackerman LLC; Stephen B. Ackerman

(57) ABSTRACT

A switching mode power converter circuit is disclosed, comprising a first high-side switch and a first low-side switch coupled in series between an input voltage level and a reference voltage level, a second high-side switch and a second low-side switch coupled in series between the input voltage level and the reference voltage level, and a control circuit for controlling switching operation of the first and second high-side switches and the first and second low-side switches. The first high-side switch has a larger on-state resistance than the second high-side switch and the first low-side switch has a larger on-state resistance than the second low-side switch. The control circuit is configured to, during an on-state of the first and second low-side switches, control the second low-side switch to switch to the off-state and control the first high-side switch to switch to the on-state, so that the first high-side switch and the first low-side switch are both in the on-state. The application
(Continued)

further relates to a method of operating such switching mode power converter circuit.

14 Claims, 8 Drawing Sheets

(52) U.S. Cl.
CPC ............. *H02M 2001/0032* (2013.01); *H02M 2001/0051* (2013.01)

(56) References Cited

U.S. PATENT DOCUMENTS

| | | | |
|---|---|---|---|
| 6,441,597 B1* | 8/2002 | Lethellier | H02M 3/158 323/222 |
| 6,737,842 B2 | 5/2004 | Bai et al. | |
| 2005/0258889 A1 | 11/2005 | Tolle et al. | |
| 2006/0007713 A1 | 1/2006 | Brown | |
| 2014/0266113 A1 | 9/2014 | Zuniga et al. | |

OTHER PUBLICATIONS

"Sensorless Optimization of Dead Timed in DC-DC Converters With Synchronous Rectifiters," by Vahid Yousefzadeh et al., IEEE Transactions on Power Electronics, vol. 21, Issue: 4, Jul. 2006, pp. 994-1002.

"PWM Dead Time Optimization Method for Automotive Multiphase DC/DC-Converters," by Tomas Reiter et al., IEEE Transactions on Power Electronics, vol. 25, Issue: 6, Jun. 2010, pp. 1604-1614.

"Observer Based PWM Dead Time Optimization in Automotive DC/DC-Converters with Synchronous Rectifiers," by T. Reiter et al., 2008 IEEE Power Electronics Specialists Conference, Jun. 15-19, 2008, pp. 3451-3456.

"Synchronous Recfification wtih Adaptive Timing Control," by Brian Acher et al., Proceedings of PESC '95—Power Electronics Specialist Conference, Jun. 18-22, 1995, pp. 88-95.

* cited by examiner

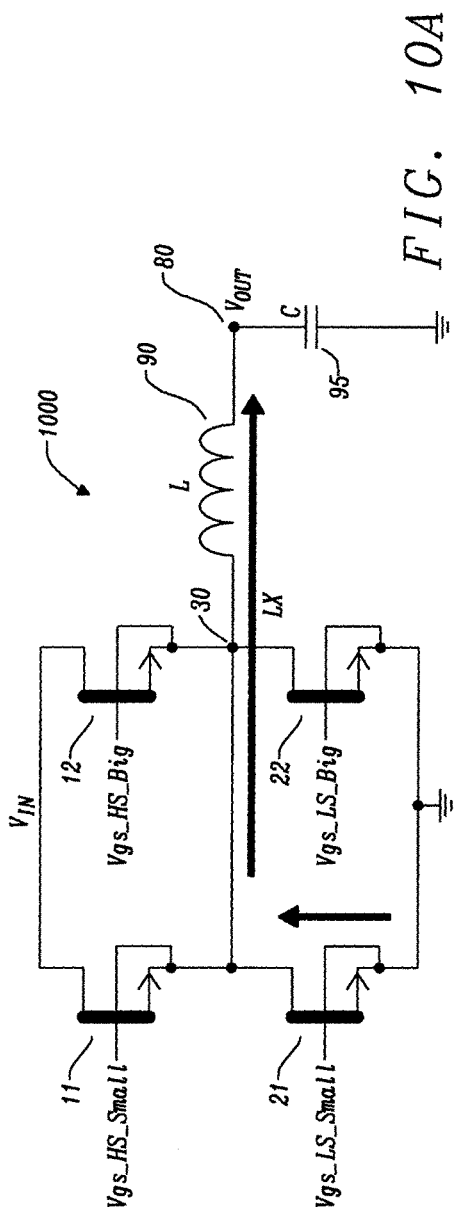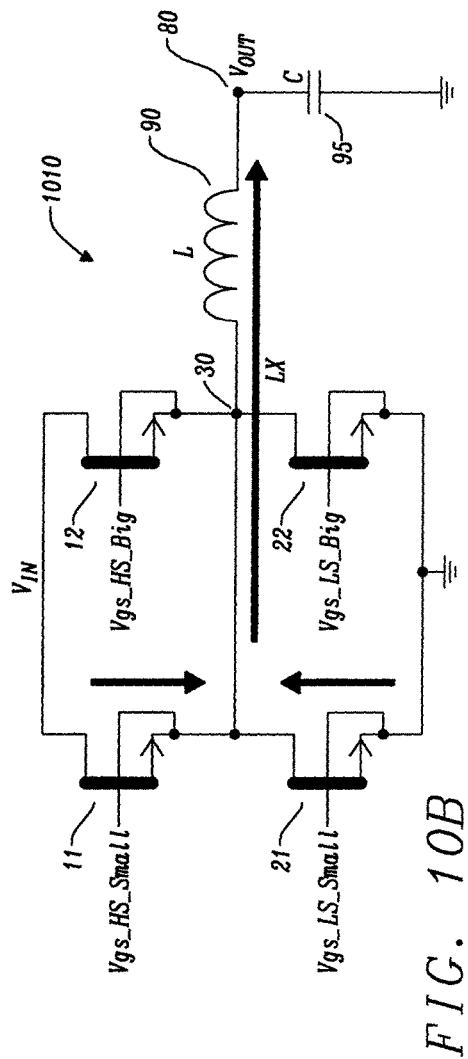
FIG. 10A
FIG. 10B

REVERSE RECOVERY CHARGE ELIMINATION IN DC/DC POWER CONVERTERS

TECHNICAL FIELD

This application relates to switching mode power converter circuits (e.g., synchronous DC/DC power converters) and methods of operating switching mode power converter circuits. The application particularly relates to such circuits and methods that reduce an efficiency loss due to the reverse recovery charge phenomenon.

BACKGROUND

Switching regulators (switching mode power converters), including ripple regulators, are commonly used because of their characteristic of high efficiency and high power density resulting from smaller magnetic, capacitive and heat sink components.

Synchronous buck power stages are a specific example of switching regulators that use two power switches such as power MOSFET devices. A high-side switch selectively couples an inductor to a positive power supply while a low-side switch selectively couples the inductor to a reference voltage level (e.g., ground). A pulse width modulation (PWM) control circuit is used to control the high-side and low-side switches. Synchronous buck regulators provide high efficiency when low ON-resistance power switches such as MOSFET devices are used.

A buck converter is an example of a commonly used switching mode power converter. A typical buck converter includes high-side and low-side power transistors (e.g., switching transistors, or transistor switches) connected between a supply voltage (input voltage) and the reference voltage level (e.g., ground), as well as an output inductor and an output filter capacitor connected in series between an intermediate node (switching node, LX node) arranged between the high-side and low-side switching transistors, and the reference voltage level (e.g., ground). The switching transistors may be FET devices, such as MOSFETs, for example.

In this arrangement, the switching transistors are alternatively activated (e.g., placed in the ON state), providing energy to a load, through the output inductor and across the output filter capacitor. The output voltage is regulated by a controller (e.g., control circuit), which determines the ON and OFF cycles of the switching transistors. Therein, the switching transistors are alternatively placed in the ON state since placing the switching transistors simultaneously in the ON state would effectively create a short circuit across the input voltage.

The transitions when both switching transistors are in the OFF state for a brief period of time are commonly referred to as dead times. During these periods, the output inductor produces a freewheeling current that flows through the body diode of the low-side switching transistor. The large forward voltage drop of the body diode results in high diode conduction and reverse recovery losses and adds to the thermal stress on the low-side switching transistor. As this process is repeated during every switching cycle, it also places a limitation of the maximum switching frequency of the switching mode power converter. This in turn prevents size reduction of the switching mode power converter, which would be a major benefit to end products such as portable equipment.

In addition, MOSFET parasitic body diode reverse recovery occurs during diode switching from the ON state to the OFF state since its stored minority charges must be removed. The minority charges may be removed either actively via negative current, or passively via recombination inside the device. All stored charge should be removed so that the depletion region can become big enough to block the reverse voltage.

The aforementioned condition occurs in synchronous DC/DC power converters every time that the low-side switching transistor is turned OFF and the high-side switching transistor is going to turn ON. In other words, the accumulated charge in the body diode of the low-side switching transistor needs to be removed each time the high-side switching transistor is turned ON.

Thus, there is a need for an improved switching mode power converter circuit, and for an improved method of switching mode power conversion. There further is a need for such circuit and method that eliminate or reduce the inverse recovery charge in the body diode of the low-side switching transistor. There is yet further need for such circuit and method that do not require additional components.

SUMMARY

In view of some or all of these needs, the present document proposes a switching mode power converter circuit and a method of operating a switching mode power converter circuit having the features of the respective independent claims.

An aspect of the disclosure relates to a switching mode power converter circuit. The switching mode power converter may include a first high-side transistor switch and a first low-side transistor switch coupled (e.g., connected) in series between an input voltage level and a reference voltage level (e.g., ground). The switching mode power converter circuit may further include a second high-side transistor switch and a second low-side transistor switch coupled (e.g., connected) in series between the input voltage level and the reference voltage level (e.g., ground). The second high-side and low-side transistor switches may be coupled (e.g., connected) in parallel to the first high-side and low-side transistor switches. The switching mode power converter circuit may yet further include a control circuit for controlling switching operation of the first and second high-side transistor switches and the first and second low-side transistor switches. The first high-side transistor switch may have a larger on-state resistance than the second high-side transistor switch and the first low-side transistor switch may have a larger on-state resistance than the second low-side transistor switch. The control circuit may be configured to, during an on-state of the first and second low-side transistor switches, control the second low-side transistor switch to switch to the off-state and control the first high-side transistor switch to switch to the on-state, so that the first high-side transistor switch and the first low-side transistor switch are both (e.g., simultaneously) in the on-state. The first high-side transistor switch and the first low-side transistor switch may be both in the on-state for a given period of time.

Configured as described above, the first (e.g., small) high-side transistor switch and the first (e.g., small) low-side transistor switch are both switched to the on-state after the low-side on-condition. Accordingly, a current may flow from the input voltage level Vin to the reference voltage level (e.g., ground) through the first high-side transistor switch and the first low-side transistor switch, so that conduction by the parasitic body diode of the low-side transistor switches is avoided. Thereby, build-up of the reverse recovery charge is avoided, and overall efficiency of the switching mode power converter circuit is improved. On the other hand, the current that flows at this stage is limited by the small sizes of the first high-side and low-side transistor switches, so that the dissipated power is well under control. In particular, the current is limited by the size of the first high-side transistor switch, which operates in the saturation region. This improvement of efficiency of the switching mode power converter circuit can be achieved without external components that would need to be added to the switching mode power converter circuit, such as Schottky diodes, so that the reverse recovery charge phenomenon can be resolved without additional cost and without requiring additional silicon area.

In embodiments, the control circuit may be further configured to, when the first high-side transistor switch and the first low-side transistor switch are both (e.g., simultaneously) in the on-state, control the first low-side transistor switch to switch to the off-state. Further, the control circuit may be configured to control the first low-side transistor switch to switch to the off-state within a predetermined period of time after the first high-side transistor switch has been controlled to switch to the on-state. Accordingly, by limiting the time during which the first high-side and low-side transistor switches are simultaneously in the on-state, power dissipation can be further reduced.

In embodiments, the switching mode power converter circuit may further include a comparator stage for detecting that both the first high-side transistor switch and the first low-side transistor switch are in the on-state and for generating a signal indicting that both the first high-side transistor switch and the first low-side transistor switch are in the on-state. This enables to switch the first low-side transistor switch to the off state immediately after the first high-side transistor switch has switched to the on-state. Thereby, the power dissipated by the current flowing from the input voltage level to the reference voltage level (e.g., ground) through the first high-side and low-side transistor switches can be minimized.

In embodiments, the control circuit may be further configured to, after controlling the first low-side transistor switch to switch to the off-state, control the second (e.g., large) high-side transistor switch to switch to the on-state. After the second high-side transistor switch has tuned to the on-state, the transition of the switching mode power converter circuit from the low-side on-condition to the high-side on-condition is complete.

In embodiments, the first and second high-side transistor switches may form a high-side pass device and the first and second low-side transistor switches may form a low-side pass device. Further, the high-side pass device and the low-side pass device may each include a plurality of slices. The slices may be equally dimensioned (e.g., identical) slices. The first high-side transistor switch may be formed by a subset (e.g., one) of the plurality of slices of the high-side pass device and the second high-side transistor switch may be formed by a remainder of the plurality of slices of the high-side pass device. Further, the first low-side transistor switch may be formed by a subset (e.g., one) of the plurality of slices of the low-side pass device and the second low-side transistor switch may be formed by a remainder of the plurality of slices of the low-side pass device. This provides a simple and efficient procedure for providing the first and second high-side transistor switches and for providing the first and second low-side transistor switches.

In embodiments, the number of slices in the subset of the plurality of slices of the high-side pass device may be smaller than the number of slices in the remainder of the plurality of slices of the high-side pass device. Further, the number of slices in the subset of the plurality of slices of the low-side pass device may be smaller than the number of slices in the remainder of the plurality of slices of the low-side pass device. Accordingly, the on-state resistance of the first high-side transistor switch is larger than the on-state resistance of the second high-side transistor switch, and the on-state resistance of the first low-side transistor switch is larger than the on-state resistance of the second low-side transistor switch.

Another aspect of the disclosure relates to a method of operating a switching mode power converter circuit. The switching mode power converter circuit may include a first high-side transistor switch and a first low-side transistor switch coupled (e.g., connected) in series between an input voltage level and a reference voltage level (e.g., ground). The switching mode power converter circuit may further include a second high-side transistor switch and a second low-side transistor switch coupled (e.g., connected) in series between the input voltage level and the reference voltage level (e.g., ground). The second high-side and low-side transistor switches may be coupled (e.g., connected) in parallel to the first high-side and low-side transistor switches. The first high-side transistor switch may have a larger on-state resistance than the second high-side transistor switch and the first low-side transistor switch may have a larger on-state resistance than the second low-side transistor switch. The method may include, during an on-state of first and second low-side transistor switches, controlling the second low-side transistor switch to switch to the off-state and controlling a first high-side transistor switch to switch to the on-state, so that the first high-side transistor switch and the first low-side transistor switch are both (e.g., simultaneously) in the on-state. The first high-side transistor switch and the first low-side transistor switch may be both in the on-state for a given period of time.

In embodiments, the method may further include, when the first high-side transistor switch and the first low-side transistor switch are both (e.g., simultaneously) in the on-state, controlling the first low-side transistor switch to switch to the off-state.

In embodiments, the method may further include controlling the first low-side transistor switch to switch to the off-state within a predetermined period of time after the first high-side transistor switch has been controlled to switch to the on-state.

In embodiments, the method may further include detecting that both the first high-side transistor switch and the first low-side transistor switch are in the on-state. The method may yet further include generating a signal indicting that both the first high-side transistor switch and the first low-side transistor switch are in the on-state.

In embodiments, the method may further include, after controlling the first low-side transistor switch to switch to the off-state, controlling the second high-side transistor switch to switch to the on-state.

In embodiments, first and second high-side transistor switches may form a high-side pass device and the first and second low-side transistor switches may form a low-side pass device.

In embodiments, the high-side pass device and the low-side pass device may each comprise a plurality of slices. The slices may be equally dimensioned slices. The first high-side transistor switch may be formed by a subset (e.g., one) of the plurality of slices of the high-side pass device and the second high-side transistor switch may be formed by a remainder of the plurality of slices of the high-side pass device. Further, the first low-side transistor switch may be formed by a subset (e.g., one) of the plurality of slices of the low-side pass device and the second low-side transistor switch may be formed by a remainder of the plurality of slices of the low-side pass device.

In embodiments, the number of slices in the subset of the plurality of slices of the high-side pass device may be smaller than the number of slices in the remainder of the plurality of slices of the high-side pass device. Further, the number of slices in the subset of the plurality of slices of the low-side pass device may be smaller than the number of slices in the remainder of the plurality of slices of the low-side pass device.

Notably, the method may be applied to any of the circuits described above, for example as a method of operating these circuits.

In the present disclosure, the low-side on-condition is understood to indicate a state in which the first and second high-side transistor switches are in the off-state (OFF) and the first and second low-side transistor switches are in the on-state (ON). Further, the high-side on-condition is understood to indicate a state in which the first and second high-side transistor switches are in the on-state (ON) and the first and second low-side transistor switches are in the off-state (OFF).

It is understood that in the present disclosure, the term "couple" or "coupled" refers to elements being in electrical communication with each other, whether directly connected e.g., via wires, or in some other manner.

Moreover, it will be appreciated that method steps and apparatus features may be interchanged in many ways. In particular, the details of the disclosed method can be implemented as an apparatus adapted to execute some or all or the steps of the method, and vice versa, as the skilled person will appreciate. In particular, it is understood that methods according to the disclosure relate to methods of operating the circuits according to the above embodiments and variations thereof, and that respective statements made with regard to the circuits likewise apply to the corresponding methods. Repetition of such statements for the corresponding methods may have been omitted for reasons of conciseness.

BRIEF DESCRIPTION OF THE DRAWINGS

Example embodiments of the disclosure are explained below with reference to the accompanying drawings, in which like reference numerals are understood to indicate identical or similar elements, unless indicated otherwise, and repeated description thereof may be omitted for reasons of conciseness. Therein, FIG. 1 schematically illustrates an example of an output stage of a switching mode power converter circuit, to which embodiments of the disclosure may be applied FIG. 2 schematically illustrates examples of possible switching states of the output stage of FIG. 1.

FIG. 10A and FIG. 10B schematically illustrate an example of an output stage of a switching mode power converter circuit, according to embodiments of the disclosure.

DETAILED DESCRIPTION

The present disclosure is applicable to any kind of DC/DC synchronous power converter (e.g., switching mode power converter). For example, the present disclosure may be applied to a buck circuit, a boost circuit, a buck-boost circuit, and isolated topologies derived from a buck circuit, a boost circuit and a buck-boost circuit. For the sake of conciseness, without intended limitation, reference may be made to a buck converter in the remainder of the disclosure.

Figure 1:
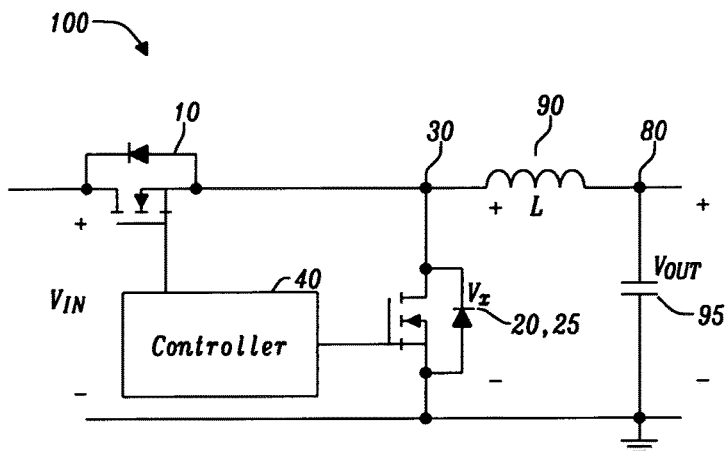

An example of output stage 100 of a buck converter (as a non-limiting example of a switching mode power converter circuit) is illustrated in FIG. 1. The output stage (e.g., the buck converter, or switching mode power converter circuit) may comprise a high-side pass device 10 and a low-side pass device 20 that are connected (or in general, coupled) between an input voltage level (e.g., supply voltage level) Vin and a reference voltage level (e.g., ground). The high-side pass device 10 may be arranged closer to the input voltage level, and the low-side pass device 20 may be arranged closer to the reference voltage level (e.g., ground). The high-side and low-side pass devices 10, 20 may be or may comprise FET devices, such as MOSFETs (e.g., PMOS transistors or NMOS transistors). The output stage may further comprise an output circuit comprising an output inductor 90 and an output capacitor (e.g. output filter capacitor) 95 coupled in series between an intermediate node (e.g. switching node, LX node) 30 that is arranged between the high-side and low-side pass devices 10, 20, and the reference voltage level (e.g., ground). An output voltage Vout may be provided at an output node 80 arranged between the output inductor 90 and the output capacitor 95.

Figure 2:
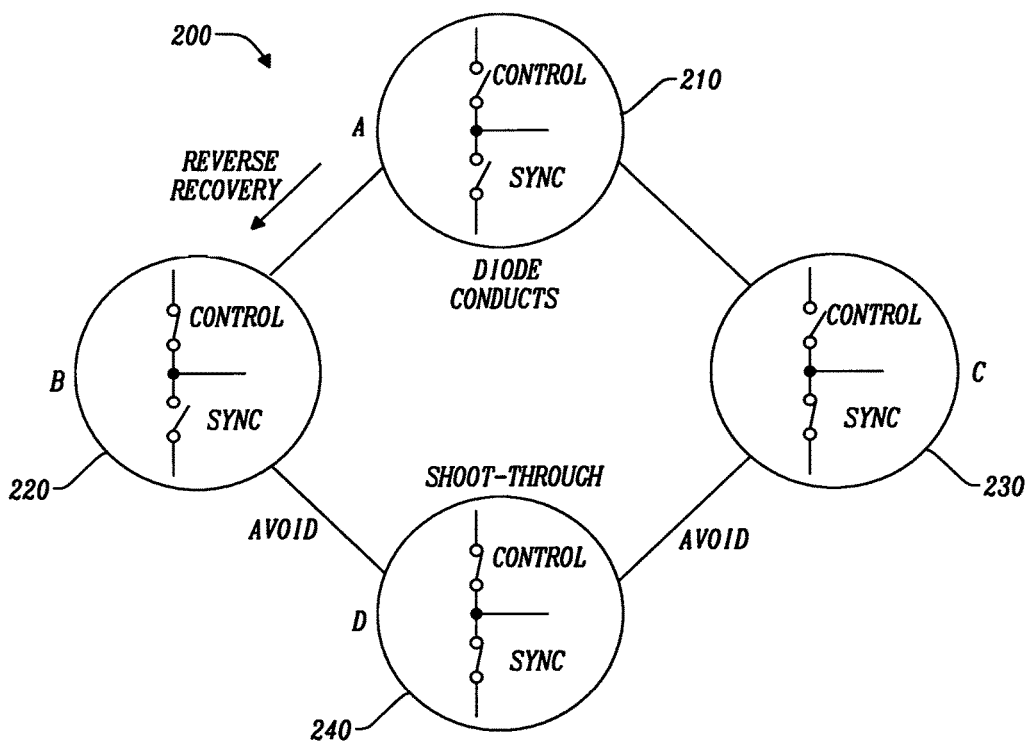

An important issue in such output stage is to avoid a shoot-trough between the high-side and the low-side during switching. Possible switching states of the output stage are schematically illustrated in state diagram 200 of FIG. 2. States A 210, B 220, and C 230 in this state diagram are allowed states. State D 240 should be avoided since a shoot-through would occur in this state. States B and C are functional states for the buck converter. State A is an intermediate state where most of the power is lost; however, going through state A is necessary in order to avoid state D, thereby avoiding the shoot-through.

The buck converter of FIG. 1 is affected by the issues indicated at the outset. Namely, during the dead times (when both pass devices are in the OFF state), the output inductor 90 may produce a freewheeling current that flows through the body diode of the low-side pass device 20. The large forward voltage drop of the body diode may result in high diode conduction and reverse recovery losses. Moreover, parasitic body diode reverse recovery may occur during diode switching from the ON state to the OFF state since its stored minority charges must be removed. The minority charges may be removed either actively via negative current, or passively via recombination inside the device. All stored charge should be removed so that the depletion region can become big enough to block the reverse voltage.

The aforementioned condition may occur every time that the low-side pass device 20 is turned OFF and the high-side pass device 10 is going to turn ON. In other words, the accumulated charge (reverse recovery charge, QRR) in the body diode of the low-side pass device 20 needs to be removed each time the high-side pass device 10 is turned ON.

Figure 3:
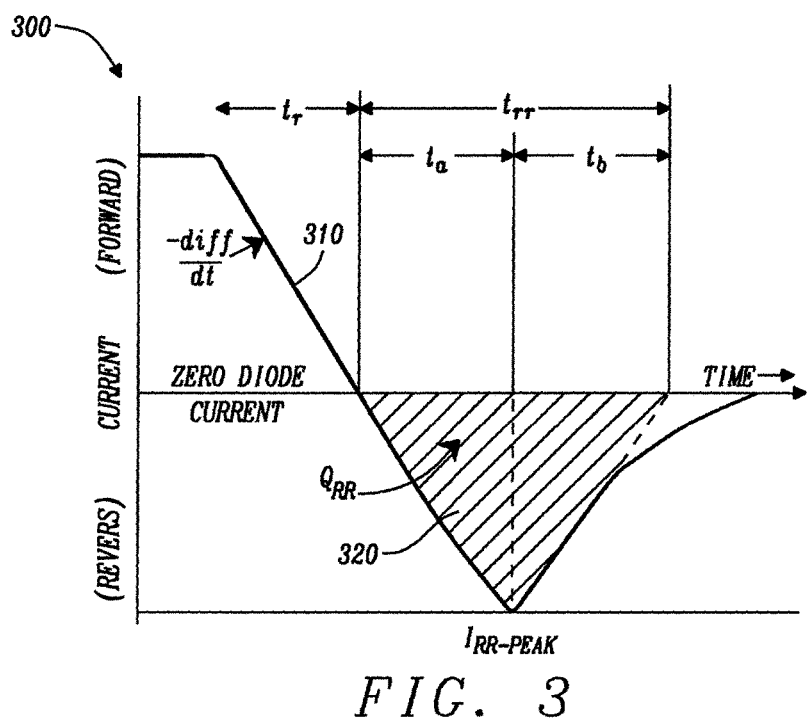
FIG. 3 is schematically illustrates an example of a current waveform in the output stage of FIG. 1.

The reverse recovery phenomenon is shown in FIG. 3, which schematically illustrates example 300 of a current waveform 310 of the coil current If (e.g., flowing through the output inductor 90) in the switching mode power converter circuit of FIG. 1. It is possible to see losses due to the dead time, where both the high-side and low-side pass devices 10, 20 are OFF and the coil current If though the output inductor 90 goes through the body diode 25 of the low-side pass device 20. The time interval from when the reverse current starts to flow through the body diode, when both the high-side and low-side pass devices 10, 20 are OFF, to the zero crossing of the coil current If is indicated by $t_r$. The magnitude of the reverse recovery charge phenomenon (QRR phenomenon) depends on the coil current If, and the time derivative dIf/dt of the coil current. The coil current If, and the reverse recovery charge QRR, have a positive relationship. In order to reduce or eliminate the reverse recovery charge QRR, one solution is to reduce the dead time as much as possible. This limits the coil current If into the body diode, which causes the QRR phenomenon. The reverse recovery charge QRR is indicated by the dashed area 320 in FIG. 3, by the time-integral of the reverse coil current over the time interval $t_{rr}=(t_a+t_b)$, where $t_a$ is the time interval between the zero crossing of the coil current If and the time that the peak reverse current $I_{RR-PEAK}$ is attained, and $t_b$ is the time interval between the time that the peak reverse current $I_{RR-PEAK}$ is attained and the time that the coil current If falls to zero.

Figure 4:
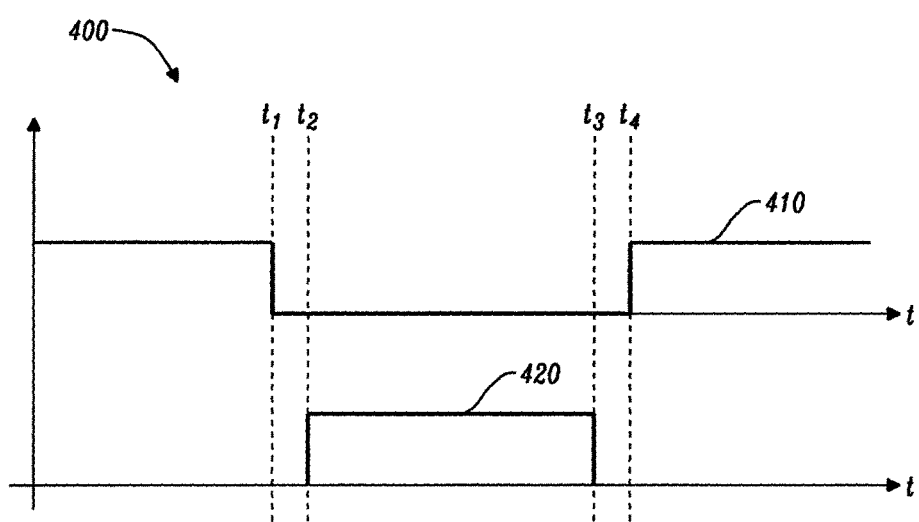
FIG. 4 schematically illustrates an example of a timing chart of a switching operation in the output stage of the switching mode power converter circuit of FIG. 1.

FIG. 4 schematically illustrates example 400 of control voltages (e.g., gate voltages) of the high-side and low-side pass devices 10, 20 in the switching mode power converter circuit of FIG. 1. Graph 410 indicates the high-side switch control signal for the high-side pass device 10 and graph 420 indicates the low-side switch control signal for the low-side pass device 20. As can be seen from graphs 410, 420, the low-side pass device 20 is switched ON a first period of time (at $t_2$) after the high-side pass device has been switched OFF (at $t_1$), and is switched OFF again (at $t_3$) a second period of time before the high-side pass device 10 is switched ON (at $t_4$). By employing control voltages as shown in FIG. 4, shoot-through can be avoided.

The first and second periods of time may be referred to as the (first and second) dead times. The QRR phenomenon is related to the second period of time, i.e., is related to the low-side pass device 20 having been switched OFF and the high-side pass device 10 going to turn ON.

Figure 5:
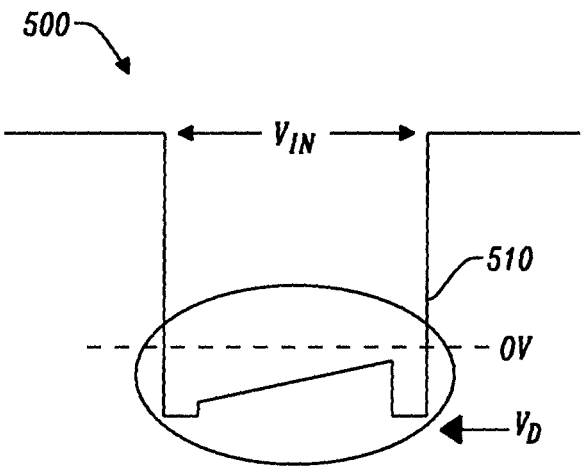
FIG. 5 schematically illustrates an example of a voltage at a switching node of the output stage of the switching mode power converter circuit of FIG. 1, FIG. 6 schematically illustrates an example of a circuit for adaptive control in a switching mode power converter circuit.

Example 500 of the voltage profile 510 of the intermediate node (e.g., output switching node, LX node) 30 of the buck converter is shown in FIG. 5. It is possible to see the timing at which the body diode of the low-side pass device 20 is activated because at this point the voltage at the intermediate node 30 goes to $-V_D$ (e.g., $\sim-700$ mV), where $V_D$ is the voltage drop across the body diode. For the case of a synchronous DC/DC converter, the body diode is the body diode of the low-side pass device 20.

In more detail, when the high-side pass device 10 is in the ON state, the intermediate node 30 is coupled to the input voltage level Vin. When the high-side pass device 10 is switched to the OFF state, the voltage at the intermediate node 30 decays rapidly. The (first) dead time (dead time period) is present until the low-side pass device 20 is placed in the ON state.

When the low-side pass device 20 is in the ON state, the voltage at the intermediate node 30 is nearly zero (0 V) as the intermediate node 30 is coupled to the reference voltage level (e.g., ground). When the low-side pass device 20 is transitioned to the OFF state, the voltage at the intermediate node 30 experiences a sharp negative fall, which begins the (second) dead time (dead time period). When the high-side pass device 10 is placed in the ON state, the intermediate node 30 is again coupled to the input voltage level Vin and the voltage at the intermediate node 30 experiences a rapid rise.

Figure 6:
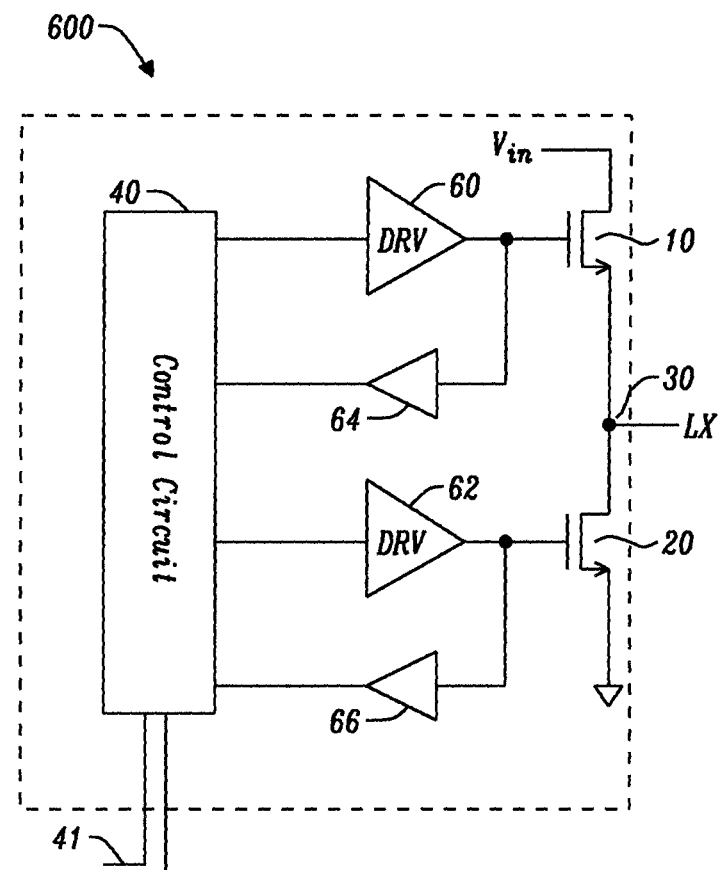

The switching scheme described above can be ensured by a control logic that, starting from a PWM signal, controls the control voltages (e.g., gate voltages) of the pass devices. Referring to a feedback from the intermediate node (e.g., LX node, output switching node), shoot-through can be reliably avoided. Example 600 of such control logic is schematically illustrated in FIG. 6. In this figure, control voltages (e.g., gate voltages) of the high-side and low-side pass devices 10, 20 are controlled by a high-side driver 60 and a low-side driver 62, respectively, that are coupled (e.g., connected) to the control terminals (e.g., gate terminals) of the high-side and low-side pass devices 10, 20. The control voltages may also be referred to as control signals. The high-side and low-side drivers 60, 62, are controlled by a control circuit 40. A high-side trigger 64 and a low-side trigger 66 provide feedback of the control voltage (e.g., gate voltage) of the high-side pass device 10 and the low-side pass device 20, respectively, to the control circuit 40. For example, the high-side trigger 64 may transform the control voltage (e.g., gate voltage) of the high-side pass device 10 to a digital signal for processing by the control circuit 40. The low-side trigger 66 may transform the control voltage (e.g., gate voltage) of the low-side pass device 20 to a digital signal for processing by the control circuit 40. The control circuit 40 may receive PWM signals 41, 42 that are signals for controlling the high-side pass device 10 and the low-side pass device 20, respectively. That is, the PWM signals 41, 42 may indicate timings at which the high-side pass device 10 and the low-side pass device 20, respectively, shall be switched.

However, this kind of control does not avoid the reverse recovery phenomenon since the dead time is always present.

Figure 7:
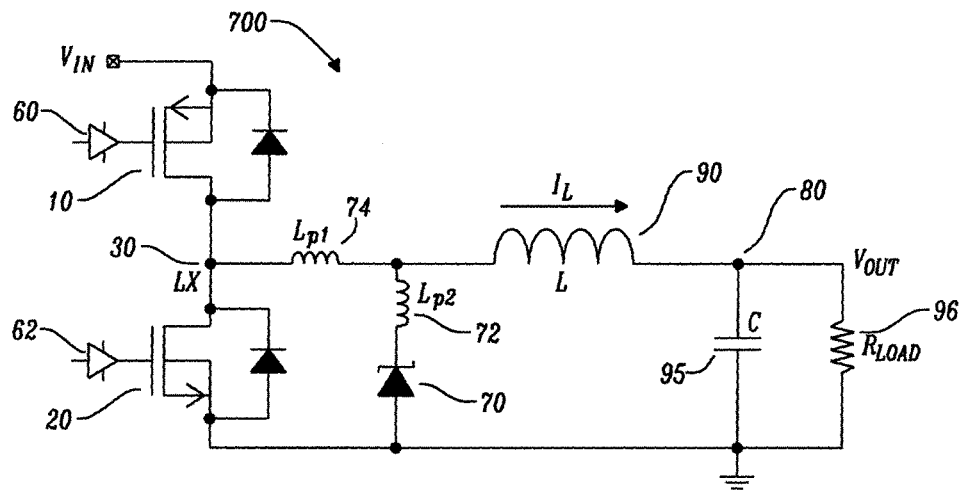
FIG. 7 schematically illustrates another example of an output stage of a switching mode power converter circuit.

One approach to address the issue at hand and to reduce losses caused by the freewheeling current is to place a low forward drop Schottky diode in parallel with the body diode of the low-side pass device 20. Example 700 of such a switching mode power converter circuit is schematically illustrated in FIG. 7, in which Schottky diode 70 is connected in parallel to the low-side pass device 20. References 72 and 74 indicate parasitic inductors Lp1 and Lp2, and reference 96 indicates a load that is connectable to the output node 80.

A Schottky diode is formed by a metal-semiconductor junction so that the minority charges are not present and there are no reverse recovery charges. A problem however is that the Schottky diode is typically added externally to the integrated switching mode power converter circuit, which results in an increased area of the printed circuit board (PCB). Moreover, since the Schottky diode is external, care must be taken with regard to circuit design in order to minimize the effect of parasitic inductors Lp1 and Lp2 (especially of parasitic inductor Lp2, since parasitic inductor Lp1 is less important for reasons of being coupled in series with the typically much larger output inductor 90). Even if the Schottky diode were integrated, this would require a large silicon area because typically the Schottky diode needs to support large currents.

Thus, addressing the reverse recovery phenomenon with a Schottky diode adds to the overall system cost and size.

Other solutions may reduce the effect of the reverse recovery phenomenon by minimizing the dead time, but these solutions typically require a very complex design.

Figure 8:
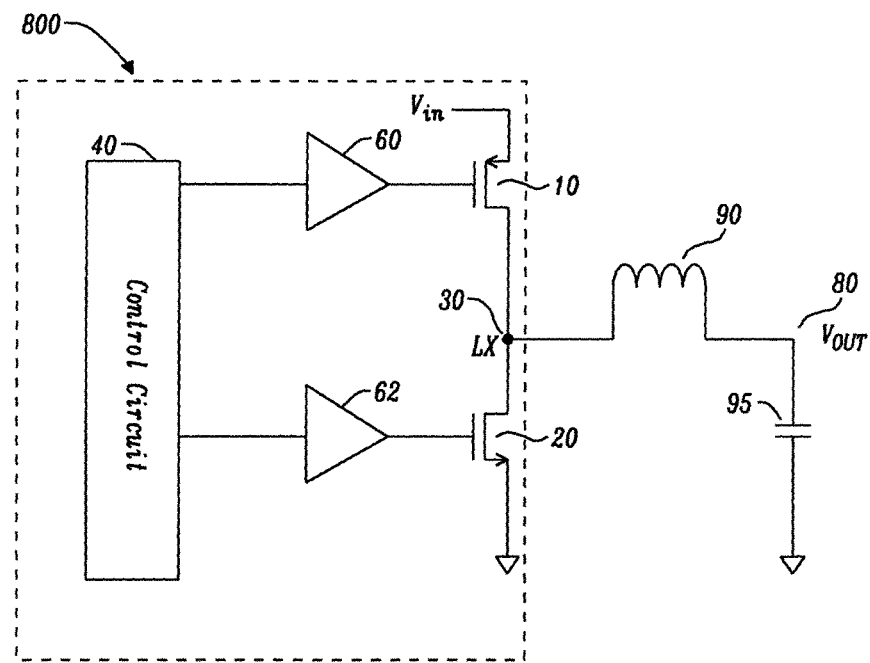
FIG. 8 schematically illustrates yet another example of an output stage of a switching mode power converter circuit.
Figure 9:
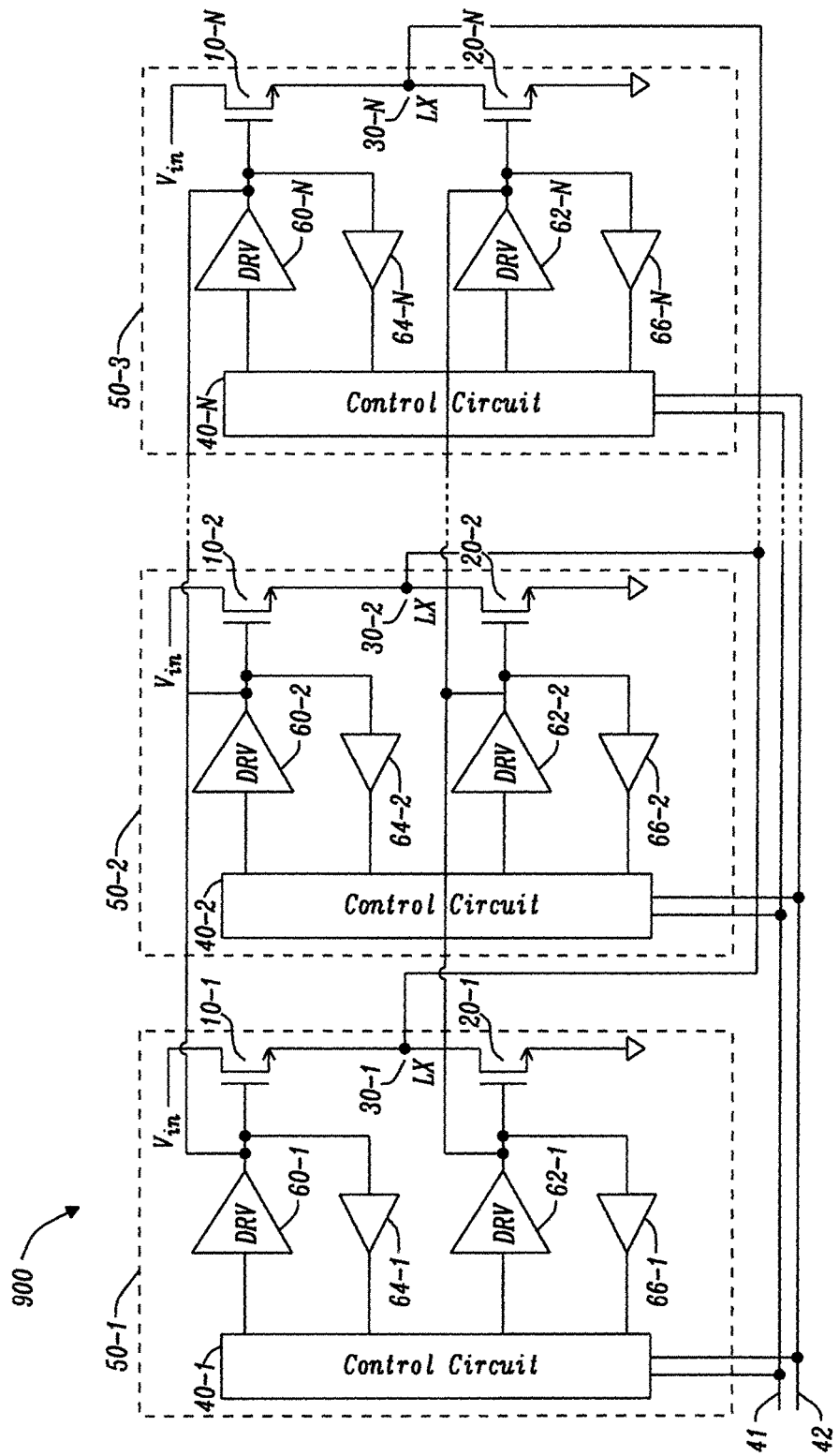
FIG. 9 schematically illustrates another example of an output stage of a switching mode power converter circuit, to which embodiments of the disclosure may be applied.

The present disclosure proposes a different solution. Broadly speaking, the idea for QRR reduction starts from the output stage architecture of a switching mode power converter circuit (e.g., buck converter). Example 800 of such output stage is illustrated in FIG. 8. Put in simple terms, the output stage is a (big) inverter that drives an output inductor 90 followed by an output capacitor 95. A typical way to implement such output stage of a switching mode power converter circuit is to have a certain number of equal (e.g., identical) slices. An example of an output stage of a switching mode power converter circuit that is built up by a plurality of slices, according to embodiments of the disclosure, is schematically illustrated in FIG. 9. In example 900 of FIG. 9, the output stage comprises (e.g. consists of) N identical slices (N≥3) of an output stage. The N slices are coupled (e.g., connected) in parallel. Each slice of the output stage comprises a respective slice 10-1, 10-2, ..., 10-N of the high-side pass device 10 (i.e., these slices form the high-side pass device 10) and a respective slice 20-1, 20-2, ..., 20-N of the low-side pass device 20 (i.e., these slices form the low-side pass device 20). Each of the slices of the output stage further comprises a respective high-side driver 60-1, 60-2, ..., 60-N for driving the respective slice 10-1, 10-2, ..., 10-N of the high-side pass device 10, a respective low-side driver 62-1, 62-2, ..., 62-N for driving the respective slice 20-1, 20-2, ..., 20-N of the low-side pass device 20, and a respective control circuit 40-1, 40-2, ..., 40-N for controlling respective high-side and low-side drivers. Each slice of the output stage may further comprise a respective high-side triggers 64-1, 64-2, ..., 64-N for providing a feedback of the control voltage of the respective slice 10-1, 10-2, ..., 10-N of the high-side pass device 10 to the respective control circuit 40-1, 40-2, ..., 40-N and a respective low-side triggers 66-1, 66-2, ..., 66-N for providing a feedback of the control voltage of the respective slice 20-1, 20-2, ..., 20-N of the low-side pass device 20 to the respective control circuit 40-1, 40-2, ..., 40-N, for example in the manner described above with reference to FIG. 6. Each slice of the output stage may further comprise a respective intermediate node (e.g., LX node, switching node) 30-1, 30-2, ..., 30-N arranged between respective slices of the high-side pass device 10 and the low-side pass device 20. These intermediate nodes are coupled to the intermediate node 30 of the output stage. PWM signals 41, 42, one for the high side and one for the low side, are supplied to each of the control circuits 40-1, 40-2, ..., 40-N for controlling the slices of the pass devices, e.g., for indicating timings at which the respective slices of the pass devices shall be switched.

In this way, the design of the output stage of the switching mode power converter circuit is modular and, depending on the output current, it is possible to enable or disable individual slices in order to have the maximum efficiency.

The idea underlying the solution proposed by the present disclosure is to avoid the turn on of the low side body diode that causes a lot of efficiency loss especially at high voltage and high current. Starting from the low-side on-condition (low-side pass device 20 in the on-state, high-side pass device 10 in the off-state) it is necessary to go to high-side on-condition (high-side pass device 10 in the on-state, low-side pass device 20 in the off-state) without turning on the body diode of the low-side pass device 20. In order to do that, the pass devices 10, 20 are each divided into a small transistor switch (e.g., consisting of one slice, or comprising few slices, in parallel) and a large transistor switch (e.g., comprising the rest of the slices, in parallel).

The resulting overall configuration of a switching mode power converter circuit, according to embodiments of the disclosure, is schematically illustrated in FIG. 10A and FIG. 10B. The switching mode power converter circuit according to embodiments of the disclosure comprises a first high-side transistor switch 11 and a first low-side transistor switch 21 that are coupled (e.g., connected) in series between the input voltage and the reference voltage level (e.g., ground). The switching mode power converter circuit further comprises a second high-side transistor switch 12 and a second low-side transistor switch 22 coupled (e.g., connected) between the input voltage level and the reference voltage level (e.g., ground), e.g., in parallel to the series connection of the first high-side transistor switch 11 and the first low-side transistor switch 21. The first and second high-side transistor switches 11, 12 may be said to form a high-side pass device 10, and the first and second low-side transistor switches 21, 22 may be said to form a low-side pass device 20. The first high-side transistor switch 11 has a larger on-state resistance than the second high-side transistor switch 12 (e.g., is a smaller device than the second high-side transistor switch 12), and the first low-side transistor switch 21 has a larger on-state resistance than the second low-side transistor switch 22 (e.g., is a smaller device than the second low-side transistor switch 22).

As indicated above, the high-side pass device 10 and the low-side pass device 20 may each comprise a plurality of slices (e.g., the same number of slices). Then, the first high-side transistor switch 11 may be formed by a subset (e.g., one or few) of the plurality of slices of the high-side pass device 10 and the second high-side transistor switch 12 may be formed by the remainder of the plurality of slices of the high-side pass device 10. Further, the first low-side transistor switch 21 may be formed by a subset (e.g., one or few) of the plurality of slices of the low-side pass device 20 and the second low-side transistor switch 22 may be formed by the remainder of the plurality of slices of the low-side pass device 20. The number of slices of in the subset of the plurality of slices of the high-side pass device 10 may be smaller than the number of slices in the remainder of the plurality of slices of the high-side pass device 10. Thereby, the on-state resistance of the first high-side transistor switch 11 can be ensured to be larger than the on-state resistance of the second high-side transistor switch 12, i.e., the first high-side transistor switch 11 can be ensured to be a smaller device than the second high-side transistor switch 12. Likewise, the number of slices of in the subset of the plurality of slices of the low-side pass device 20 may be smaller than the number of slices in the remainder of the plurality of slices of the low-side pass device 20. Thereby, the on-state resistance of the first low-side transistor switch 21 can be ensured to be larger than the on-state resistance of the second low-side transistor switch 22, i.e., the first low-side transistor switch 21 can be ensured to be a smaller device than the second low-side transistor switch 22.

An intermediate node (e.g., LX node, switching node) 30 of the switching mode power converter circuit is coupled (e.g., connected) to respective nodes arranged between the first high-side transistor switch 11 and the first low-side transistor switch 11, and between the second high-side transistor switch 12 and the second low-side transistor switch 22. Put differently, the first high-side transistor switch 11 and the second high-side transistor switch 12 are coupled (e.g., connected) in parallel between the input voltage and the intermediate node 30, and the first low-side transistor switch 21 and the second low-side transistor switch 22 are coupled (e.g., connected) in parallel between the intermediate node 30 and the reference voltage level (e.g., ground). An output inductor 90 and an output capacitor 95 are coupled (e.g., connected) in series between the intermediate node 30 and the reference voltage level (e.g., ground), with an output node 80 of the switching mode power converter circuit in between. The switching mode power converter circuit further comprises one or more control circuits for controlling switching operation of the first and second high-side transistor switches 11, 12 and the first and second low-side transistor switches 21, 22, which are not shown in FIG. 10A and FIG. 10B for reasons of conciseness. The switching mode power converter circuit may further comprise respective drivers and/or amplifiers (also not shown), in analogy to the configuration shown for example in FIG. 9.

In this configuration, instead of switching off all low-side transistor switches 21, 22, only the second (e.g., large) low-side transistor switch is switched off (starting from the low-side on-condition), so that the current can go through the first (e.g., small) low-side transistor switch 21 and the turn on of the body diode is avoided. This is schematically illustrated in example 1000 of FIG. 10A in which the solid arrows indicates the direction of current flow.

After the first (e.g., small) high-side transistor switch 11 is turned on, a current will flow from the input voltage level Vin to the reference voltage level (e.g., ground). This is schematically illustrated in example 1010 of FIG. 10B. However, this current is well-controlled since only the first (e.g., small) transistor switches of the high-side and low-side pass devices are turned on.

The cross-conduction current is now limited by the first (e.g., small) high-side transistor switch 11 (because it works in saturation region, whereas the small low side works in triode region). The first high-side transistor switch 11 may be dimensioned as small as possible (e.g., it should barely be able to let the intermediate node 30 rise above the reference voltage level (e.g., ground) so that a signal for turning off the first (e.g., small) low-side transistor switch 21 can be triggered). In addition to that, the first high-side transistor switch 11 works in cross conduction with the first low-side transistor switch 21 only for a limited (e.g., very short) amount of time (e.g., few ns, that may be the delay for triggering the signal for turning off the first low-side transistor switch 21).

Accordingly, the control circuit of the switching mode power converter circuit may be configured to control, during an on-state of the first and second low-side transistor switches 21, 22, the second (e.g., large) low-side transistor switch 22 to switch to the off-state and the first (e.g., small) high-side transistor switch 11 to switch to the on-state, so that the first high-side transistor switch 11 and the first low-side transistor switch 21 are both in the on-state. The second low-side transistor switch 22 may be controlled to switch to the off-state first.

Comparing the proposed solution to the solutions described above (which may be seen as using only a large high-side transistor switch and a large low-side transistor switch), the power loss due to the reverse recovery charge QRR in the solutions described above is much larger because of a larger current (only limited by the high-side transistor switch) and a longer duration (due to the diode reverse recovery time).

According to embodiments of the disclosure, the first high-side and low-side transistor switches 11, 21 may be dimensioned as small as possible. Small sizes of these transistor switches also help to reduce the low-side turn-off delay. A lower limit on their sizes is set by the condition that forward conduction of their back diodes is to be avoided. This limit is given approximately by If·Ron_small<0.7V, where If is the inductor current flowing through the output inductor 90.

As soon as the first (e.g., small) high-side transistor switch 11 has been turned on, the first low-side transistor switch 21 is turned off, preferably very fast. Accordingly, the control circuit of the switching mode power converter circuit may be configured to control, when the first (e.g., small) high-side transistor switch 11 and the first (e.g., small) low-side transistor switch 21 are both in the on-state, the first low-side transistor switch 21 to switch to the off-state. In embodiments of the disclosure, the first low-side transistor switch 21 is controlled to switch to the off-state within a predetermined (e.g., short) period of time after the first high-side transistor switch 11 has been controlled to switch to the on-state. To this end, the switching mode power converter circuit may comprise a comparator stage (e.g., comprising a fast comparator) for detecting that both the first high-side transistor switch 11 and the first low-side transistor switch 21 are in the on-state. The comparator stage may further generate a signal indicting that both the first high-side transistor switch 11 and the first low-side transistor switch 21 are in the on-state. This signal may be used for triggering control for the first low-side transistor switch 21 to switch to the off-state.

After the first low-side transistor switch 21 has switched to the off-state, the second (e.g., large) high-side transistor switch 12 is controlled to turn to the on-state. Accordingly, the control circuit of the switching mode power converter circuit may be further configured to control, after controlling the first low-side transistor switch 21 to switch to the off-state, the second high-side transistor switch 12 to switch to the on-state.

Then, after the second (e.g., large) high-side transistor switch 12 has been turned on, the system has finished the transition from the low-side on-condition to the high-side on-condition without turning on the body diode of the low-side pass device 20.

Summarizing, switching from the low-side on-condition (low-side pass device 20 switched ON, i.e., first and second low-side transistor switches 21, 22 switched ON, and high-side pass device 10 switched OFF, i.e., first and second high-side transistor switches 11, 12 switched OFF) to the high-side on-condition (high-side pass device 10 switched ON, i.e., first and second high-side transistor switches 11, 12 switched ON, and low-side pass device 20 switched OFF, i.e., first and second low-side transistor switches switched OFF) proceeds as follows (i.e., proceeds through the following states):

1. First and second low-side transistor switches 21, 22 switched ON, first and second high-side transistor switches switched OFF
2. First low-side transistor switch 21 switched ON, second low-side transistor switch 22 and first and second high-side transistor switches 11, 12 switched OFF
3. First low-side transistor switch 21 and first high-side transistor switch 11 switched ON, second low-side transistor switch 22 and second high-side transistor switch 12 switched OFF
4. First high-side transistor switch 11 switch ON, second high-side transistor switch 12 and first and second low-side transistor switches 21, 22 switched OFF
5. First and second high-side transistor switches 11, 12 switched ON, first and second low-side transistor switches 21, 22 switched OFF.

Figure 11:
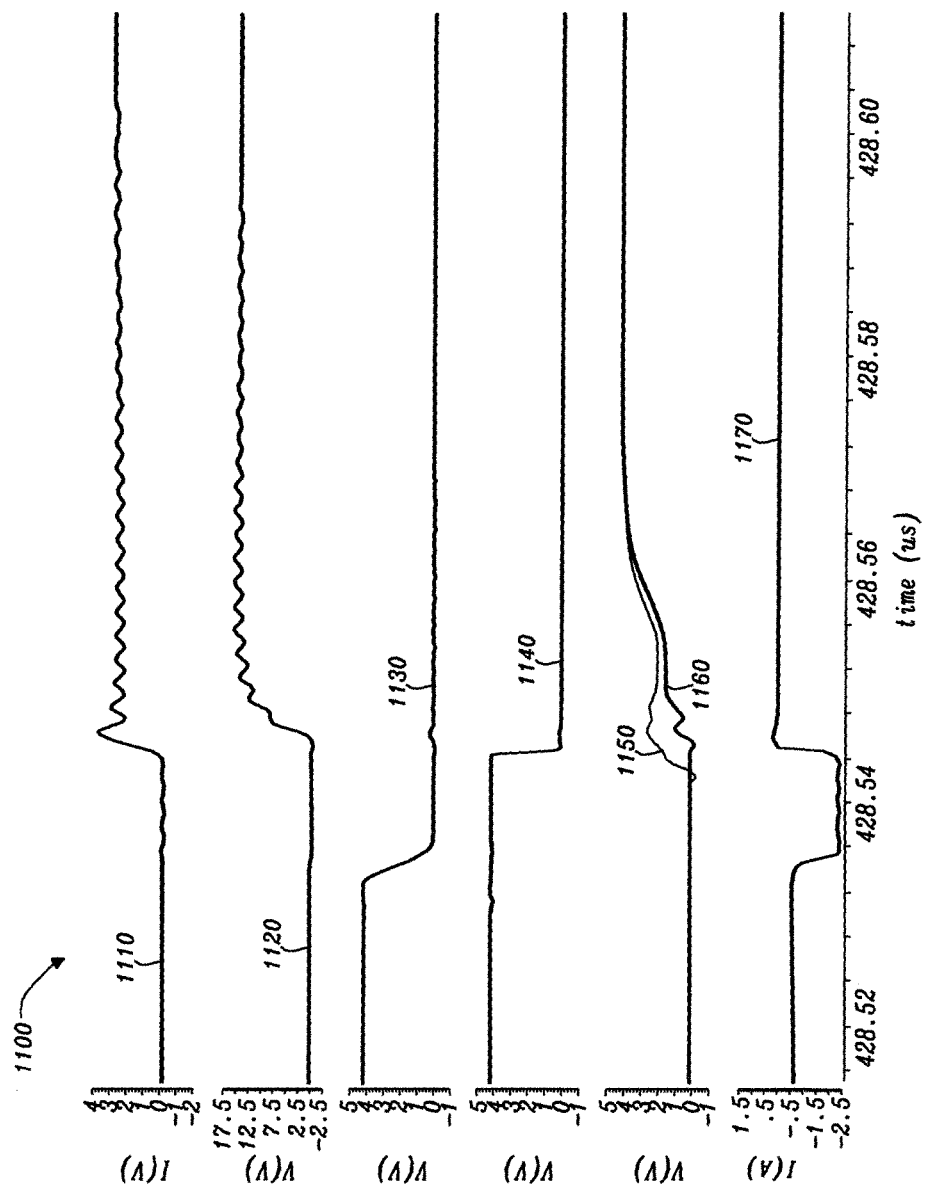
FIG. 11 schematically illustrates examples of current and voltage waveforms in a switching mode power converter circuit, according to embodiments of the disclosure.

FIG. 11 illustrates example 1100 of current and voltage waveforms in a switching mode power converter circuit according to embodiments of the disclosure. In this figure, graph 1110 indicates the current flowing through the low-side pass device 20, graph 1120 indicates the voltage at the intermediate node (e.g., LX node, switching node) 30, graph 1130 indicates the control voltage (e.g., gate voltage, gate-source voltage) of the second (e.g., large) low-side transistor switch 22, graph 1140 indicates the control voltage (e.g., gate voltage, gate-source voltage) of the first (e.g., small) low-side transistor switch 21, graph 1150 indicates the control voltage (e.g., gate voltage, gate-source voltage) of the first (e.g., small) high-side transistor switch 11, graph 1160 indicates the control voltage (e.g., gate voltage, gate-source voltage) of the second (e.g., large) high-side transistor switch 12, and graph 1170 indicates the current flowing through the first (e.g., small) low-side transistor switch 21. As can be seen from this figure, the intermediate node (e.g., LX node, switching node) 30 does not go to $-V_D$ during the transition between the low-side on-condition and the high-side on-condition.

An important advantage of the proposed solution over the solutions described above is that the QRR phenomenon is resolved without requiring additional silicon area.

Compared to conventional switching mode power converter circuits, the switching mode power converter circuit, according to embodiments of the disclosure, may comprise an additional comparator stage (e.g., comprising or consisting of a very fast comparator) for detecting the small high-side transistor switch turn-on in order to turn off the small low-side transistor switch. The faster this comparator stage is, the smaller is the loss due to short circuit (shoot-through). However, this short circuit is not really dangerous since the transistor switch devices (transistor switches) are small and the high side is not really turned on because of the miller plateau.

The proposed solution can be applied both to a high-side NMOS topology and to a high-side PMOS topology; the underlying concept as explained above is the same in both cases. FIG. 6, FIG. 9, FIG. 10A, and FIG. 10B show high-side NMOS topologies, whereas FIG. 7 and FIG. 8 show high-side PMOS topologies.

It should be noted that the apparatus features described above correspond to respective method features that may however not be explicitly described, for reasons of conciseness. The disclosure of the present document is considered to extend also to such method features. In particular, the present disclosure is understood to relate to methods of operating the circuits described above.

Figure 12:
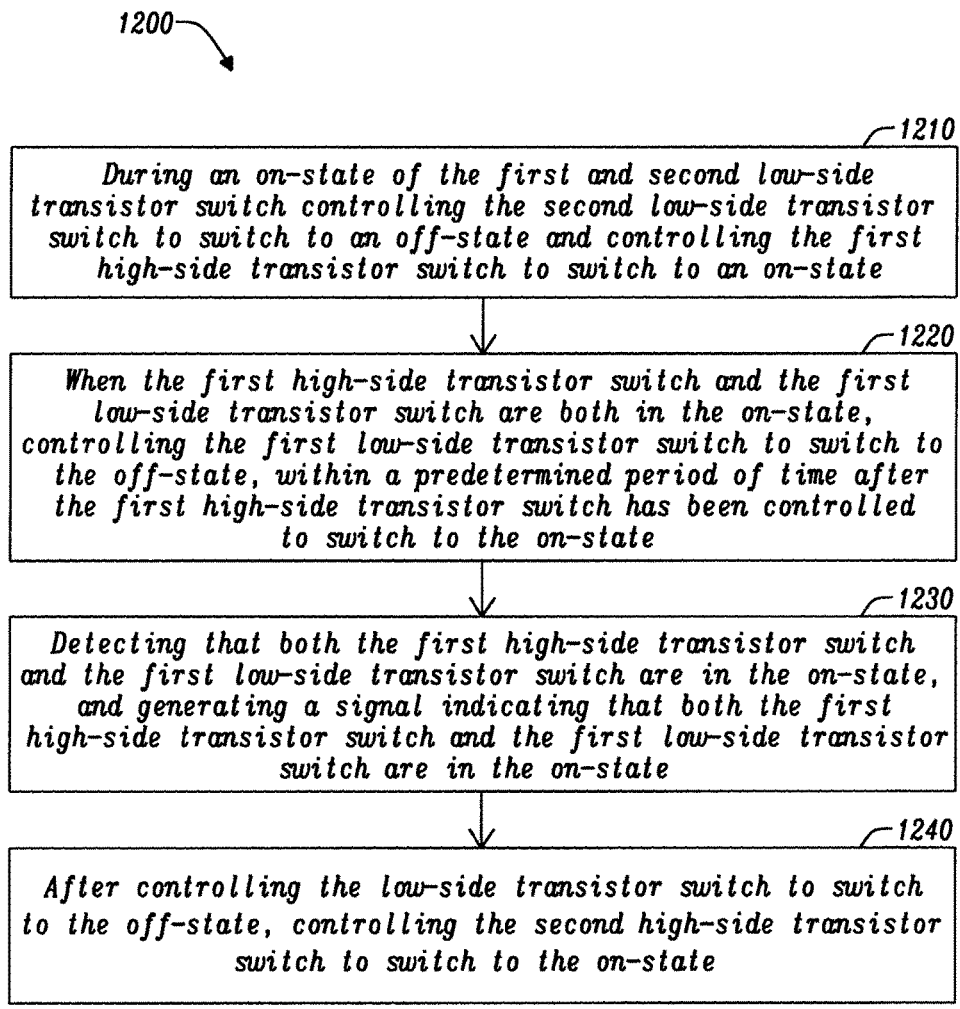
FIG. 12 shows a flow chart of a method of reverse recovery charge elimination in DC/DC power converters, according to embodiments of the disclosure.

FIG. 12 shows a flow chart of a method of reverse recovery charge elimination in DC/DC power converters, according to embodiments of the disclosure. The method 1200 comprises 1210, during an on-state of the first and second low-side transistor switch, controlling the second low-side transistor switch to switch to an off-state and controlling the first high-side transistor switch to switch to an on-state. The method 1200 further comprises 1220, when the first high-side transistor switch and the first low-side transistor switch are both in the on-state, controlling the first low-side transistor switch to switch to the off-state within a predetermined period of time after the first high-side transistor switch has been controlled to switch to the on-state. The method 1200 still further comprises 1230 detecting that both the first high-side transistor switch and the first low-side transistor switch are in the on-state, and generating a signal indicting that both the first high-side transistor switch and the first low-side transistor switch are in the on-state. The method 1200 also comprises 1240 after controlling the first low-side transistor switch to switch to the off-state, controlling the second high-side transistor switch to switch to the on-state.

It should further be noted that the description and drawings merely illustrate the principles of the proposed apparatus. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A switching mode power converter circuit, comprising:
    a first high-side transistor switch and a first low-side transistor switch coupled in series between an input voltage level and a reference voltage level;
    a second high-side transistor switch and a second low-side transistor switch coupled in series between the input voltage level and the reference voltage level; and
    a control circuit for controlling switching operation of the first and second high-side transistor switches and the first and second low-side transistor switches,
    wherein the first high-side transistor switch has a larger on-state resistance than the second high-side transistor switch and the first low-side transistor switch has a larger on-state resistance than the second low-side transistor switch; and
    wherein the control circuit is configured to, during an on-state of the first and second low-side transistor switches, control the second low-side transistor switch to switch to an off-state and control the first high-side transistor switch to switch to an on-state, so that the first high-side transistor switch and the first low-side transistor switch are both in the on-state.

2. The switching mode power converter circuit according to claim 1, wherein the control circuit is further configured to, when the first high-side transistor switch and the first low-side transistor switch are both in the on-state, control the first low-side transistor switch to switch to the off-state.

3. The switching mode power converter circuit according to claim 2, wherein the control circuit is configured to control the first low-side transistor switch to switch to the off-state within a predetermined period of time after the first high-side transistor switch has been controlled to switch to the on-state.

4. The switching mode power converter circuit according to claim 3, further comprising a comparator stage for detecting that both the first high-side transistor switch and the first low-side transistor switch are in the on-state and for generating a signal indicting that both the first high-side transistor switch and the first low-side transistor switch are in the on-state.

5. The switching mode power converter circuit according claim 2, wherein the control circuit is further configured to, after controlling the first low-side transistor switch to switch to the off-state, control the second high-side transistor switch to switch to the on-state.

6. The switching mode power converter circuit according claim 1, wherein the first and second high-side transistor switches form a high-side pass device and the first and second low-side transistor switches form a low-side pass device.

7. The switching mode power converter circuit according to claim 6, wherein the high-side pass device and the low-side pass device each comprise a plurality of slices;
the first high-side transistor switch is formed by a subset of the plurality of slices of the high-side pass device and the second high-side transistor switch is formed by a remainder of the plurality of slices of the high-side pass device; and
the first low-side transistor switch is formed by a subset of the plurality of slices of the low-side pass device and the second low-side transistor switch is formed by a remainder of the plurality of slices of the low-side pass device.

8. The switching mode power converter circuit according to claim 7, wherein a number of slices in the subset of the plurality of slices of the high-side pass device is smaller than a number of slices in the remainder of the plurality of slices of the high-side pass device; and
a number of slices in the subset of the plurality of slices of the low-side pass device is smaller than a number of slices in the remainder of the plurality of slices of the low-side pass device.

9. A method of operating a switching mode power converter circuit having a first high-side transistor switch and a first low-side transistor switch coupled in series between an input voltage level and a reference voltage level, and a second high-side transistor switch and a second low-side transistor switch coupled in series between the input voltage level and the reference voltage level, wherein the first high-side transistor switch has a larger on-state resistance than the second high-side transistor switch and the first low-side transistor switch has a larger on-state resistance than the second low-side transistor switch, the method comprising:

during an on-state of the first and second low-side transistor switch, controlling the second low-side transistor switch to switch to an off-state and controlling the first high-side transistor switch to switch to an on-state, so that the first high-side transistor switch and the first low-side transistor switch are both in the on-state,
wherein the first and second high-side transistor switches form a high-side pass device and the first and second low-side transistor switches form a low-side pass device;
the high-side pass device and the low-side pass device each comprise a plurality of slices;
the first high-side transistor switch is formed by a subset of the plurality of slices of the high-side pass device and the second high-side transistor switch is formed by a remainder of the plurality of slices of the high-side pass device; and
the first low-side transistor switch is formed by a subset of the plurality of slices of the low-side pass device and the second low-side transistor switch is formed by a remainder of the plurality of slices of the low-side pass device.

10. The method according to claim 9, further comprising:
when the first high-side transistor switch and the first low-side transistor switch are both in the on-state, controlling the first low-side transistor switch to switch to the off-state.

11. The method according to claim 10, further comprising:
controlling the first low-side transistor switch to switch to the off-state within a predetermined period of time after the first high-side transistor switch has been controlled to switch to the on-state.

12. The method according to claim 11, further comprising:
detecting that both the first high-side transistor switch and the first low-side transistor switch are in the on-state; and
generating a signal indicting that both the first high-side transistor switch and the first low-side transistor switch are in the on-state.

13. The method according to claim 10, further comprising:
after controlling the first low-side transistor switch to switch to the off-state, controlling the second high-side transistor switch to switch to the on-state.

14. The method according to claim 9, wherein the number of slices in the subset of the plurality of slices of the high-side pass device is smaller than the number of slices in the remainder of the plurality of slices of the high-side pass device; and
the number of slices in the subset of the plurality of slices of the low-side pass device is smaller than the number of slices in the remainder of the plurality of slices of the low-side pass device.

* * * * *